Patented July 20, 1948

2,445,669

UNITED STATES PATENT OFFICE 2,445,669

CHEMICAL PROCESS FOR PRODUCTION OF POTABLE WATER FROM NONPOTABLE SALINE WATER

Alexander Goetz, Pasadena, Calif., assignor to Sunshine Mining Company, Yakima, Wash., a corporation No Drawing. Application June 22, 1943, Serial No. 491,840

5 Claims. (Cl. 210—23)

This application is a continuation-in-part of my application Serial No. 453,596, filed August 4, 1942, now Patent No. 2,322,689.

My invention pertains to a chemical process for production of potable water from non-potable saline waters. The invention relates more particularly to the production of a potable water from sea water by a method involving chemical desalination of the sea water in respect to the salts originally contained therein which are responsible for its non-potability.

It has long been the practice to subject sea water and other saline waters to distillation for the production of a potable water as the distillate or for the recovery of the residue salts or for both purposes. It has also long been the practice to subject saline waters, more particularly more or less concentrated waste brines from certain mining operations, paper manufacturing operations and the like, to chemical treatment, as distinguished from distillation, solely for selective recovery therefrom of some one or more of the contained alkali and alkaline earth metals or their salts, and in some instances for the recovery of bromine or iodine or some halide compound from brines containing them. Also, it has less frequently been a prior art practice to subject various saline waters to both chemical and distillation treatments for selective recovery of the desired metals or their salts by the chemical treatment while still enabling the production of a potable water by a final distillation treatment.

So far as I am aware, however, none of such prior art chemical treatments alone, without the use of a distillation step, has been suitable for the production of a potable water from the non-potable brine or other saline water. Moreover, such prior methods of treating saline waters, whether for the production of a potable water or recovery of its contained metals or salts, or both, usually require expertly manufactured, cumbersome and expensive apparatus, as in the case of the stills employed in the distillation method in particular; and, also, for the chemical methods, relatively large separate supplies of chemical reagents and expert knowledge of and accuracy in the chemical procedures.

Accordingly, a general object of my invention is to provide a chemical process for production of potable water from various saline waters without the employment of a distillation step and requiring the use of only a few chemical reagents in small quantities which may be compactly stored in relatively small containers ready for immediate use, usually requiring not more than two such containers, and requiring only simple and readily improvised apparatus and no expert knowledge of or accuracy in the chemical procedures.

A more particular object of my invention is to provide such a chemical process as last outlined above for its especial suitability of use in the production of potable water from sea water by shipwrecked persons on life rafts and the like as a protection against suffering or death by thirst through lack of potable water, as, obviously, in such a situation stills are not available nor could the situation be met by any chemical method requiring a relatively large supply of chemical reagents and expert knowledge of and accuracy in their use.

The foregoing objects of my invention and the principles thereof will more fully appear in the following detailed description of the invention and specific examples thereof as applied to the production of a potable water from sea water in fulfillment of the above stated particular object of the invention. It is to be understood, however, that while the invention is particularly applicable to and finds its greatest usefulness in the production of a potable water from sea water under the emergency conditions briefly outlined above, it is not limited to that particular use or those particular conditions of use, but may be usefully employed in the production of potable water from non-potable saline waters generally. Hence, the following description and specific examples of practice of the invention in the production of a potable water from sea water under the stated emergency conditions, are to be taken as illustrating and not as limiting the invention.

Referring further to the conditions which must be and are met by the method of my invention as applied to the treatment of sea water in fulfillment of the hereinbefore stated particular object of that invention:

(1) The treatment must not only render the sea water potable by de-salination of its originally contained salts responsible for its non-potability, but the treatment must also not develop toxic properties in the de-salinated water.

(2) The treatment must be such as to leave the finally treated and potable water with an osmotic pressure of a sufficiently low order to enable diffusion of that water through the intestinal membranes of the consumer into the blood stream.

(3) The treatment must be applicable with a minimum of equipment, preferably without special containers, and without the application of heat, and preferably without the necessity of a filtration step.

(4) The required chemicals should be a minimum as to weight and bulk, preferably in mass weight not more than 10 per cent of the mass of the sea water to be treated, and definitely less than 20 per cent.

(5) The chemicals employed should be of a permanent nature in the sense of not readily deteriorating or changing from their original chemical properties under atmospheric or other conditions to which they are normally subjected prior to actual use.

(6) The treatment should not require accurate determination, by titrations or otherwise, of the quantities of solvent water in the mass of sea water undergoing the treatment, or of its saline solutes responsible for the non-potability of the water, or of the reagents used for the required de-salination. In particular, the treatment should permit the use of an appreciable excess of the de-salinating reagent over the optimum quantity of any prescribed exact quantity without spoiling the result in the production of a potable water, since the process must be performable without exact measurement of the quantity of the reagent used.

(7) In view of some appreciable variation of salinity between different oceans, such, for example, as the Baltic Sea and the Red Sea, a variation in the minimum quantity of the chemical reagent for the required de-salination of the sea water by a factor of 2 should be provided for.

(8) The duration of the treatment for its completion in the production of a potable water should not exceed three to four hours and may preferably be of even shorter duration.

(9) In view of the emergency nature of the treatment the cost of the chemicals used is not of substantial importance.

While, as stated above, there is some quite appreciable variation in the degrees of salinity of different oceans, according to authoritative published analyses that variation is within such limits as to present the total content of salts in sea water as from 2 to 4 per cent by weight of the total weight of the entire mass of solvent water and solutes, with an average for the great oceans as about 3.5 per cent. The main constituents of the solutes are as given in the following table in their respective percentage weights relative to the total weight of all the solutes:

| | |
|---|---|
| Sodium chloride, NaCl | 77.8 |
| Magnesium chloride, $MgCl_2$ | 10.9 |
| Magnesium sulfate, $MgSO_4$ | 4.7 |
| Calcium sulfate, $CaSO_4$ | 3.6 |
| Potassium sulfate, $K_2SO_4$ | 2.5 |
| Calcium carbonate, $CaCO_3$ | 0.3 |
| Minor constituents | 0.2 |
| | 100.0 |

From the foregoing table, it is apparent that the two major constituents of sea water salts are the sodium chloride and the magnesium chloride; and they are chiefly responsible for the non-potability of that water. That is so not only because those salts are present in substantial amounts but also because they are in a dissociated solution state in the sea water with respect to the sodium cation of the sodium chloride, the magnesium cation of the magnesium chloride and the chlorine anion of each; and in that state, and in the substantial amounts presented, those salts, or their respective cations or anions, are not physiologically tolerable in the human system. Hence, the de-salination of the sea water with respect to those salts is essential to the attainment of the object of the invention in the production of a potable water.

The three next listed salts of the foregoing table, the sulfates of magnesium, calcium and potassium, are also in a dissociated solution state in the sea water with respect to their cations magnesium, calcium and potassium and the sulfate anion of each. But, in their decidedly minor amounts, those salts are sufficiently physiologically tolerable in the human system that the de-salination of the sea water with respect to them is not essential for the transformation of sea water to a potable water, and that is especially so for the hereinbefore stated emergency use of the process. However, such de-salination has certain advantages and is included in certain practices of my invention as hereinafter described. For example, when such de-salination is not employed in the practice of the invention, the finally produced water presents a substantial degree of hardness due in part to the calcium sulfate, and some degree of laxative effect due principally to the magnesium sulfate and to a lesser extent to the potassium sulfate. But none of those properties appear in sufficiently high degree to render the water impossible or even distinctly unsatisfactory as a potable water either in taste or physiological effect.

Also the hardness imparted to the finally treated water by the calcium carbonate listed in the foregoing table of sea water salts is obviously of so little importance as to require no de-salination of the sea water so far as that salt is concerned.

For the de-salination of sea water in respect to the sodium chloride and magnesium chloride, the invention comprises the addition to that water of a reagent compound of silver, which may be either a silver salt exhibiting a substantial degree of solubility and tendency to dissociate when added to the sea water or an oxide of silver. In either case, however, the silver compound should be one capable of reacting with the mentioned chlorides in the sea water to form the substantially insoluble silver chloride and an insoluble compound of magnesium, for the removal of the chlorine anion and the magnesium cation in the precipitates, and form a soluble compound of sodium which, if physiologically intolerable, may be transformed into a physiologically tolerable salt in the hereinafter described subsequent step of adding a weak organic acid. Among such salts, I preferably employ silver carbonate $Ag_2CO_3$ and for the oxide I preferably employ silver oxide $Ag_2O$. The latter has substantial advantages over the former, primarily because of its lighter weight and the high OH concentration in the treated water resulting from the formation of sodium hydroxide when silver oxide is used.

The silver oxide, $Ag_2O$, as such in the dry state in the form of a fine powder, may be added to a collected body of sea water of suitable mass for the treatment such, for example, as 2000 cc., and uniformly dispersed therein by stirring, agitation or any other suitable means. Alternatively, and as an extremely convenient mode of use of that reagent, a colloidal dispersion of silver oxide in ordinary non-saline water in the form of a paste may be prepared and added to the collected body of sea water, as such a paste disperses very readily and substantially uniformly throughout the body of the sea water.

When the paste is added in the prescribed or roughly estimated quantity to the collected body of sea water, the reactions effecting the desalination of that water in respect to the sodium chloride and the magnesium chloride may be represented by the following equation:

$$2Ag_2O + 2NaCl + MgCl_2 + 2H_2O = 4AgCl + 2NaOH + Mg(OH)_2$$

Or, to more precisely represent the generally accepted view that in the presence of water the silver oxide, $Ag_2O$, acts as an hydroxide or hydrous silver oxide, the reactions may be represented by the following equation:

$$3AgOH + NaCl + MgCl_2 + 3AgCl + NaOH + Mg(OH)_2$$

Substantially all of the formed silver chloride readily precipitates since its solubility is exceedingly small (about $10^{-7}$ mol.) even if some slight excess of the chlorine anion should remain in the water undergoing the treatment. As the formed magnesium hydroxide is practically insoluble in water, it also is precipitated and simultaneously with the silver chloride. Hence, by the further step of separating the supernatants from the precipitates, either by filtration or decanting off the supernatants, the body of sea water undergoing the treatment is freed substantially entirely of the originally contained magnesium chloride and from the physiologically intolerable chlorine anion of its originally contained sodium chloride. The only remnant of those salts in any substantial quantity then remaining in solution in the thus treated sea water is the sodium cation of the originally contained sodium chloride and the hydroxyl anion of the silver hydroxide; and since the sodium hydroxide in solution in water is toxic in its effects, the sea water must be further treated for the final production of potable water.

The further treatment of the sea water comprises subjecting the supernatant water containing the toxic sodium hydroxide solute to an acid, or other compound containing or carrying hydrogen available for exchange with the sodium cation of the sodium hydroxide and functioning after the manner of an acid, which will so react with the sodium hydroxide solute as to produce a substantially water soluble non-toxic sodium compound or a slightly water soluble or substantially insoluble, non-toxic sodium compound. In any case, the general purpose of such further treatment is the substantially complete neutralization of the toxic sodium hydroxide solute, with or without actual removal of substantially all or a portion of the sodium cation from the supernatant water undergoing the treatment.

After the hereinbefore described initial steps of precipitation and removal of silver chloride and magnesium hydroxide from the sea water, substantially all of the sodium cation may be retained in the remaining water undergoing the further treatment by exchanging the toxic hydroxyl anion of the sodium hydroxide with an anion which is physiologically tolerable when associated with the sodium in the newly formed compound and in which compound the sodium is also physiologically tolerable as in certain water soluble salts of sodium which have but little tendency to dissociate.

The anion of any one of a number of weak organic acids is suitable as a physiologically tolerable or non-toxic anion to replace the hydroxyl of the sodium hydroxide, such as the hydrous succinic acids, more particularly hydroxysuccinic acid or malic acid and dihydroxysuccinic acid or tartaric acid; also lactic acid and citric acid. Those enumerated acids are only examples of weak organic acids with non-toxic and palatable ions which may be used. However, another consideration obtains which renders the acid with the anion or acid radical of highest valence the most preferable although not necessarily the only suitable one which may be used. The reason for that preference is as follows:

As hereinbefore stated, the treatment of the sea water must be such as to leave the finally produced potable water with an osmotic pressure of a sufficiently low order to enable diffusion of that water through the intestinal membranes of the consumer into the blood stream. According to the laws governing the osmotic pressure of aqueous solutions, that pressure varies directly with the number of molecules of the solute, and the solvent liquid diffuses through the membrane from the side of lowest concentration of solutes or lowest osmotic pressure to the side of highest concentration of solutes or highest osmotic pressure. Hence, the number of molecules of the solute in the consumed solvent water should be at a minimum in order to produce a minimum osmotic pressure for a maximum diffusion of that water through the intestinal membranes of the consumer into the blood stream. And, finally, with respect to the soluble non-toxic salt of sodium to be formed, the number of molecules of that salt in solution will be at a minimum for the maximum number of sodium cations which can be bound by the anion or acid radical of the selected acid. Hence, the anion or acid radical of the highest valence is preferable, which, of course, points to the citric acid as the most preferable one of the above listed acids. However, in some cases it may be advantageous to include with the citric acid a very minor amount of malic acid.

An aqueous solution of citric acid of high concentration is used, and when added to the sea water containing the sodium hydroxide in solution as a result of the last preceding treatment, the reaction is as represented by the equation $$3NaOH + H_3C_6H_5O_7 = Na_3C_6H_5O_7 + 3H_2O$$

The thus-far treated sea water has had its major salts, sodium chloride and magnesium chloride, removed; and, aside from the other salts of the foregoing table which are present in such minor amounts as not to necessarily require removal, the water contains sodium citrate as its chief constituent in but very slightly dissociated state and with no appreciable taste or toxic effect.

If the treated sea water is to be consumed for extended periods of time (more than a week), it may be desirable to remove substantially all or a considerable portion of the sodium from the treated water instead of leaving substantially all of the sodium in the finally treated water as a water-soluble and non-toxic sodium compound, such as sodium citrate as in the last-above described step of neutralization of the sodium hydroxide by citric acid, for example. To that end, any suitable acid may be employed which will so react with the sodium hydroxide solute of the water undergoing the treatment as to form a non-toxic sodium salt of the acid which is either only slightly soluble or substantially insoluble in the water undergoing the treatment.

One such suitable acid is uric acid. After the hereinbefore described initial steps of precipitation of silver chloride and magnesium hydroxide in and removal of those precipitates from the collected body of sea water undergoing the treatment, uric acid in the form of a fine, white water-insoluble powder may be dispersed in the remaining water containing the sodium hydroxide, and by surface-reaction the dispersed uric acid powder exchanges its hydrogen with the sodium of the sodium hydroxide and forms, first a water soluble salt, di-sodium urate. Upon continued dispersion of a sufficient quantity of the uric acid powder by stirring or kneading a quantity of the powder in the water, however, the sodium ion concentration is sufficiently reduced and the hydrogen ion concentration sufficiently increased so that the first-formed di-sodium urate is transformed into monosodium urate which is substantially insoluble in the water undergoing the treatment. The final result of such use of the uric acid is a removal of most (75–90%) of the sodium in the water undergoing the treatment, in the water insoluble monosodium urate which is precipitated and is then removed from the body of the water undergoing the treatment.

In other words, the reaction of the uric acid with the sodium hydroxide in the water may be quite as correctly described as an exchange taking place between the hydrogen ion of that acid and the sodium ion of the sodium hydroxide in the water. This exchange is greatly facilitated by the hereinbefore mentioned high OH— concentration which reacts preferentially or selectively with the hydrogen of the acid in the formation of HOH, thus freeing the uric radical, despite its practical insolubility in water, for the reaction with the sodium ion forming, in the incomplete stage of the reaction, a soluble sodium salt, di-sodium-urate. An indication that the OH— concentration is the primary agent for this reaction appears in the fact that the degree of sodium removal for the same quantities of water, uric acid and sodium ion corresponds with the degree of OH— concentration, the sodium ions of sodium carbonate, for example, being removed by the uric acid to a much lesser degree.

My invention further comprises a similar procedure of neutralization of the sodium hydroxide in the water undergoing the treatment, with removal of the major amount of the sodium, after the formation of the sodium hydroxide in the hereinbefore described initial steps of precipitation of silver chloride and magnesium hydroxide in the collected body of sea water, followed if necessary by neutralization of the remaining sodium hydroxide by an acid, such as citric acid, for example, with resulting formation of a water-soluble and non-toxic sodium salt of the acid and thereby retention of the remaining sodium in the finally treated water. I have found that such a procedure presents certain advantages over the hereinbefore described procedures of substantially complete neutralization of the sodium hydroxide in one acid adding step, whether the latter be that of using an acid such as citric acid, for example, for the formation of a non-toxic water soluble sodium salt with resulting retention of all the sodium in the finally treated water or using an acid, such as uric acid for example, for the formation of a non-toxic and only slightly water soluble or substantially water-insoluble sodium salt with resulting removal of substantially all the sodium from the finally treated water.

In the above-mentioned intermediate step of partial neutralization of the sodium hydroxide in the water undergoing the treatment, with removal of a substantial amount but not all of the sodium, I may employ any suitable water-insoluble material, whether it be an acid proper or not, containing or carrying hydrogen available for exchange with the sodium cation of the sodium hydroxide, with resulting transformation of the hydroxyl of the sodium hydroxide to water and transfer of the sodium to the employed material in exchange for its released hydrogen when the material is dispersed in fine particle form in the water undergoing the treatment.

Although the above-mentioned intermediate removal of the major amount of the sodium in the treated sea water involves a reaction separate and distinct from the reaction between the silver and the chloride ions involved in the initial step of employing silver oxide for precipitation of silver chloride and magnesium hydroxide, these different reactions do not in all practices of the invention necessitate an actual increase in the number of procedural steps of the process. In particular, no increase in the number of procedural steps is required when the reagent employed in the intermediate removal of the major amount of the sodium in the treated water is one which does not react with the silver chloride formed in the initial step of the process. However, since uric acid partially reacts with silver chloride with formation of silver urate, when that acid is employed as the sodium-removal agent it increases the number of separate procedural steps since the uric acid should be added to the water undergoing the treatment only after the complete removal of the precipitated silver chloride resulting from the initial procedural step of adding the silver oxide to the sea water. Hence, where the actual removal of sodium ions from the treated water is required, such an acid as uric acid forming a substantially insoluble sodium salt of the acid may be employed but, for simplicity of operations, it is preferable to employ a sodium-removal agent which, unlike uric acid, does not react with silver chloride.

I, therefore, preferably employ for such intermediate step of my improved process, the hydrogen form of a material within the class of what is commonly known or frequently used as a base-exchanging material, such as one of the zeolites or Permutit, or one of the synthetic resins of the phenol-formaldehyde type. The zeolite may, for example, be one which has been acid treated to present a hydrogen form of the zeolite, such as referred to in the Tiger Patent 2,227,520 as a "hydrogen ion zeolite," and the synthetic resin may, for example, be one of the phenol-formaldehyde resins referred to in the Pattock Patent 2,264,402 as a hydrogen exchanger.

In using any one of the above materials, the character of the reaction may be represented generally by the following equation:

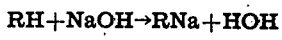

$$RH + NaOH \rightarrow RNa + HOH$$

in which RH represents the hydrogen form of the zeolite or synthetic resin, with R representing the component thereof which carries the hydrogen but does not participate directly in the reaction as does the hydrogen.

Referring somewhat more in detail to the process with the above mentioned intermediate step incorporated therein, following the hereinbefore described initial step of treating the original collected body of sea water with silver oxide, for example, the selected hydrogen-ion zeolite or synthetic resin in the form of a fine granular powder is added to and dispersed in the remaining water containing the sodium hydroxide solute. The added material is insoluble and does not change in appearance when brought into contact with the NaOH solution. After such dispersion, the water undergoing the treatment may be left quiescent for a brief period for sedimentation of the insoluble compound of the sodium with the material of the zeolite or resin left after release of the hydrogen from that material. If only an amount of the hydrogen ion zeolite, Permutit or synthetic phenol-formaldehyde resin is employed for a 50 to 60 per cent neutralization of the sodium hydroxide in the water undergoing the treatment and removal of such percentage amount of the sodium from that water, as may be desirable in some instances, the final step of complete neutralization may then be by the use of citric acid as hereinbefore described.

The selected hydrogen ion zeolite, Permutit or synthetic phenol-formaldehyde resin can, of course, be employed in sufficient amount to completely neutralize the sodium hydroxide in the water undergoing the treatment, with removal of substantially all the sodium. But ordinarily the above-described incomplete removal is preferable, primarily because such partial neutralization followed by the final acid step, such as the addition of citric acid, for example, results in a very substantial saving in weight and bulk of the reagent materials employed, which is a factor of very considerable importance in the production of a potable water from sea water, for reasons hereinbefore pointed out.

However, even with that neutralization of the sodium hydroxide, the high concentration of the resulting sodium citrate renders a slight excess of free (citric) acid desirable in order to overcome an alkaline taste of the treated water. Hence, some mode of determining when a state of substantially complete neutralization of the sodium hydroxide and the desired excess of free acid have been attained, is desirable. But it is not essential that a titration or like procedural step be incorporated in the process; for a harmless mere sipping taste of the water to which the acid is added may be used as a sufficient guide for the addition of the acid in sufficient amount for substantially complete neutralization of the sodium hydroxide and sufficient reduction of the alkaline taste to render the water acceptable as a potable water.

However my invention may also advantageously be practiced with an additional procedural step incorporated therein by way of an adjustment of the hydrogen ion concentration of the water. Experiments have shown that in the case of sodium citrate the most pleasant and least alkaline taste of the water is reached as a pH of the approximate order of 5.8, and that a potable water having that pH may be attained by adjusting the concentration of the citrate through adjustment of the amount of the citric acid added to the water. To accomplish that optimum concentration of the citrate to produce the most palatable potable water, any one of the well known indicators may be used which exhibits a distinctly observable color change in the 5.8 region of the pH, such, for example as dibromothymolsulfonphthalein or dinitrobenzoyleneurea.

The first of those indicators is preferably employed, mainly because it shifts in color from blue to yellow in the 5.8 region of the pH, and blue-yellow color blindness is almost unknown, whereas the second of the two last-mentioned indicators shifts from yellow to white, and a lack of eye sensitivity to yellow is sometimes encountered. Only a trace of any one of the above indicators is needed; and while the selected indicator may be separately added to the water undergoing the treatment, for greater convenience of its use it may be admixed with the hereinbefore mentioned citric acid or it may be applied to a separate carrier material, such as paper, cloth and the like, attached to the container of the citric acid and added to the water as the citric acid is added. If any other of the above mentioned acids than citric acid is used to form a sodium salt with the anion of the acid, the optimum potability of the water in respect to taste and alkalinity is attained at other pH values different for each acid used. The operating principles are, however, the same as indicated above in the use of the citric acid; and so are the principles applying to the indicator dye in case of substantially complete removal of the sodium ions from the water undergoing the treatment by employing an adequate amount of the sodium-removal agent.

Citric acid will not function as the sodium-removal agent due to the fact that it forms a water-soluble salt of sodium, as do also the hereinbefore mentioned malic, tartaric and lactic acids. But removal of the sodium ions either partially or completely may be attained, as hereinbefore stated, by employing a suitable water-insoluble material, such as uric acid or certain hereinbefore mentioned forms of zeolites and phenol-formaldehyde resins, having hydrogen available for exchange with the sodium cation in the water and forming therewith a substantially water-insoluble compound; and it is quite as advantageous to use an indicator dye with such material as it is to use such a dye with the citric acid. For example, when using one of the hereinbefore mentioned hydrogen-ion-resins, it is advantageous to employ an indicator dye to indicate the removal of the major part or substantially all of the sodium from the water undergoing the treatment. While there are several well known color indicators which might be used, phenolphthalein is preferably used with the hydrogen-ion-resin because the change in color of that indicator occurring in the pH range of 8 is particularly significant of neutralization of the water when attained entirely through removal of the sodium ions by the use of such cation-exchange material.

The process may also be carried out in principle substantially as described above with the use of silver carbonate instead of the silver oxide or hydrous silver oxide, although somewhat less advantageously as hereinbefore stated. In the use of the silver carbonate reagent, followed by the citric acid as the preferred weak organic acid, the reactions are analogous to those described above. In the reactions of the silver carbonate with the chlorides of sodium and magnesium in the sea water, the substantially insoluble silver chloride and magnesium carbonate and the soluble sodium carbonate are formed. The supernatant water containing the sodium carbonate is separated from the precipitates and treated with a weak organic acid, preferably citric acid, as before, and the sodium carbonate thereby transformed to sodium citrate with evolution of free carbon dioxide.

As hereinbefore pointed out, the additional desalination of the sea water in respect to the sulfates of magnesium, calcium and potassium is not essential to all useful embodiments or practices of my invention in the production of a potable water. In particular that additional desalination is not essential to or of any great importance in the emergency production of a potable water from sea water in cases of shipwreck.

However, that additional de-salination is included as a feature of the invention in certain of its embodiments or practices for the additional advantage derived therefrom.

For that de-salination, my invention comprises the employment of an hydrous oxide or hydroxide of any base element which will react with the respective sulfates of the sea water to form an insoluble sulfate of the base element, the insoluble hydroxide of magnesium and the soluble hydroxides of sodium and potassium. Thus, when that is followed by filtration or other mode of separation of the supernatant water from the precipitates, the sea water is freed from the SO4 anion of each of its originally contained sulfates and from the magnesium cation of its originally contained magnesium sulfate. The soluble hydroxides of calcium and potassium which remain in the water undergoing the treatment may then be transformed into citrates or other salts of weak organic acids after the manner already described in respect to sodium hydroxide.

For the foregoing additional de-salination of the sea water I preferably employ barium as the basic element of the hydrous de-salinating reagent; and for convenience of its use the barium hydroxide may be incorporated into the hydrous paste made from silver oxide and water. When the barium hydroxide either separately or in the composite paste is added to the sea water, the occurring reaction of that reagent with the magnesium sulfate is as represented in the equation

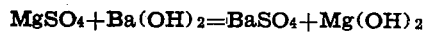
$$MgSO_4 + Ba(OH)_2 = BaSO_4 + Mg(OH)_2$$

Both of the indicated resulting components are practically insoluble and readily precipitate.

In analogous reactions of the barium hydroxide with the sulfates of calcium and potassium, the insoluble barium sulfate and the soluble hydroxides of calcium and potassium are formed. Those soluble and toxic hydroxides are then transformed into the soluble potassium citrate and the only very slightly soluble calcium citrate by the addition of citric acid after the hereinbefore described manner of transformation of the sodium hydroxide into sodium citrate. Not only are both of the thus formed calcium and potassium citrates non-toxic in solution in the finally treated water, but both occur in such slight concentrations as to be physiologically unimportant in any event.

Substantially the only precaution required in the foregoing use of barium hydroxide is to avoid any appreciable excess of free barium, on account of its severe toxic properties. But the use of any such excess may be readily guarded against by admixing the barium hydroxide with the silver oxide in an amount which supplies the barium hydroxide in appreciably less amount than its exact stoichiometric relationship with the SO4 anion of the sulfates in the sea water requires for complete reaction in the formation of barium sulfate and hence complete removal of the SO4 anion from the treated water. In other words, the sulfates occur in minor and relatively unimportant concentrations in the sea water in any event, and while there is some advantage in the removal of the sulfate anion, substantial realization of that advantage does not necessarily require complete removal of the sulfate anion.

I claim:

1. A process for the production of potable water from sea water, which comprises mixing said sea water with silver oxide and a zeolite and with barium hydroxide, each in an amount sufficient to precipitate chloride ion of the sea water as silver chloride and to bind sodium ion of the sea water to the zeolite as the sodium form of said zeolite and to convert magnesium ion into magnesium hydroxide and sulfate ion into barium sulfate, each in amount to give potable water, and separating the treated sea water from the magnesium hydroxide, sodium form of the zeolite and barium sulfate to give potable water.

2. A process for the production of potable water from sea water, which comprises contacting the sea water with silver oxide and a zeolite in an amount sufficient to convert chloride ion of the sea water into silver chloride and magnesium ion of the sea water into magnesium hydroxide, and also contacting said sea water with barium hydroxide in an amount sufficient to convert sulfate ion in the sea water into barium sulfate, and separating potable sea water from the insoluble sodium form of said zeolite and from the barium sulfate, magnesium hydroxide, and silver chloride.

3. A method for the production of potable water from sea water, which comprises contacting sea water with silver oxide and barium hydroxide and a zeolite carrying a cation which is exchangeable with sodium ion of the sea water, forming silver chloride and barium sulfate and the sodium form of said zeolite by such treatment, and removing potable water from the silver chloride, sodium form of said zeolite, magnesium hydroxide, and barium sulfate.

4. A process for the production of potable water from sea water, which comprises contacting the chloride ion of sea water with a silver compound chosen from the group consisting of silver oxide and silver carbonate to form silver chloride, binding the Na ion of the sea water as a sodium form of a zeolite by reaction with a zeolite, precipitating barium sulfate by reacting the sulfate ion with barium hydroxide, all in sufficient quantity to form potable water, and separating the barium sulfate, silver chloride, and sodium form of said zeolite from said potable water.

5. A process for the production of potable water from sea water which comprises contacting said water: with a silver compound chosen from the group consisting of silver oxide and silver carbonate to precipitate the chloride ion of said sea water; with a zeolite reacting with the sodium ion of said sea water to give a sodium form of said zeolite; and with barium hydroxide to precipitate barium sulfate by reacting with the sulfate ion of said sea water; and separating said potable water from the silver chloride and sodium form of said zeolite and barium sulfate.

ALEXANDER GOETZ.

REFERENCES CITED

The following references are of record in the file of this patent:

UNITED STATES PATENTS

| Number | Name | Date |
| --- | --- | --- |
| 621,805 | Fischer | Mar. 28, 1899 |
| 1,978,447 | Austerweil et al. | Oct. 30, 1934 |
| 2,008,131 | Dieck | July 16, 1935 |
| 2,117,631 | Seyb | May 17, 1938 |
| 2,127,310 | Riley | Aug. 16, 1938 |
| 2,155,318 | Liebknecht | Apr. 18, 1939 |
| 2,226,134 | Liebknecht | Dec. 24, 1940 |
| 2,227,520 | Tiger | Jan. 7, 1941 |
| 2,264,402 | Pattock | Dec. 2, 1941 |
| 2,294,764 | Urbain | Sept. 1, 1942 |
| 2,301,669 | Richter | Nov. 10, 1942 |

(Other references on following page)

UNITED STATES PATENTS

| Number | Name | Date |
|---|---|---|
| 2,322,689 | Goetz | June 22, 1943 |
| 2,325,675 | Gustafson | Aug. 3, 1943 |
| 2,363,020 | Spealman | Nov. 21, 1944 |
| 2,366,007 | D'Alelio | Dec. 26, 1944 |

FOREIGN PATENTS

| Number | Country | Date |
|---|---|---|
| 450,575 | Great Britain | July 21, 1936 |

OTHER REFERENCES

"Demineralizing Solutions by a Two-Step Ion Exchange Process," by Howard L. Tiger and Sidney Sussman. Industrial and Engineering Chemistry, vol. 35, No. 2, Feb. 1943.

"Ion Exchange Resins," by Frederick J. Myers. (Same journal), No. 8, Aug. 1943.

Certificate of Correction

Patent No. 2,445,669.                                                                 July 20, 1948.

ALEXANDER GOETZ

It is hereby certified that error appears in the printed specification of the above numbered patent requiring correction as follows: Column 5, line 15, for that portion of the equation reading "+3AgCl" read $=3AgCl$; and that the said Letters Patent should be read with this correction therein that the same may conform to the record of the case in the Patent Office.

Signed and sealed this 23rd day of November, A. D. 1948.

[SEAL]

THOMAS F. MURPHY,
*Assistant Commissioner of Patents.*